April 21, 1942.  A. N. BRUNSON  2,280,057
SUPPORT FOR SURVEYING INSTRUMENT TELESCOPES
Filed May 31, 1940  2 Sheets-Sheet 1

INVENTOR.
Amber N. Brunson
BY
ATTORNEY.

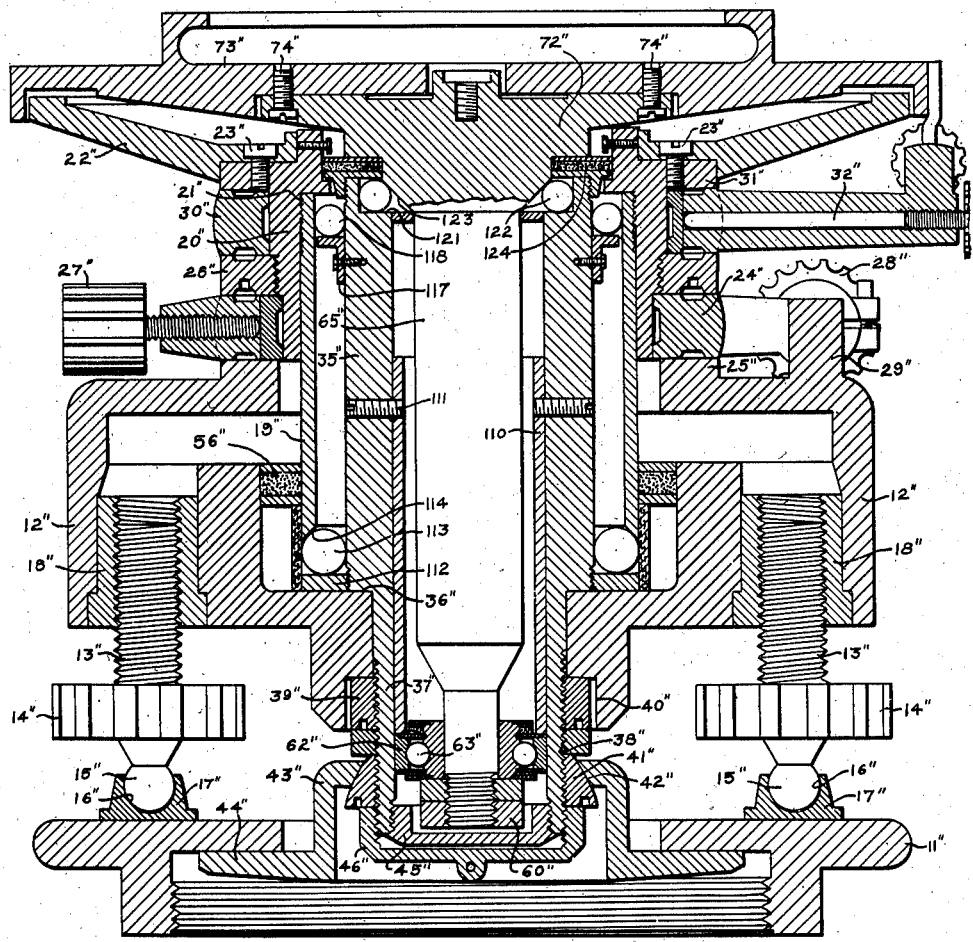

Patented Apr. 21, 1942

2,280,057

UNITED STATES PATENT OFFICE 2,280,057

SUPPORT FOR SURVEYING INSTRUMENT TELESCOPES

Amber N. Brunson, Kansas City, Mo.

Application May 31, 1940, Serial No. 338,125

8 Claims. (Cl. 33—46)

This invention relates to improvements in surveying instruments.

The general object of the invention is to provide a surveying instrument such as a transit with novel supporting means for the telescope whereby greater accuracy is secured.

A more specific object of the invention is to provide a novel spindle mounting for the telescope of a surveying instrument.

Another object of the invention is to provide a surveyor's transit including a novel post construction.

An additional object of the invention is to provide an improved surveying instrument wherein the post serves as the inside race for an outside bearing and also serves as an outside race for an inside bearing.

Another object of the invention is to provide an improved mounting for the telescope of a surveyor's instrument so designed that the parts remain accurate regardless of expansion and contraction.

Other objects and the advantages of this invention will be apparent from the following description taken in connection with the accompanying drawings, wherein:

Fig. 3 is a view similar to Fig. 1 showing a further modification.

Figure 1:
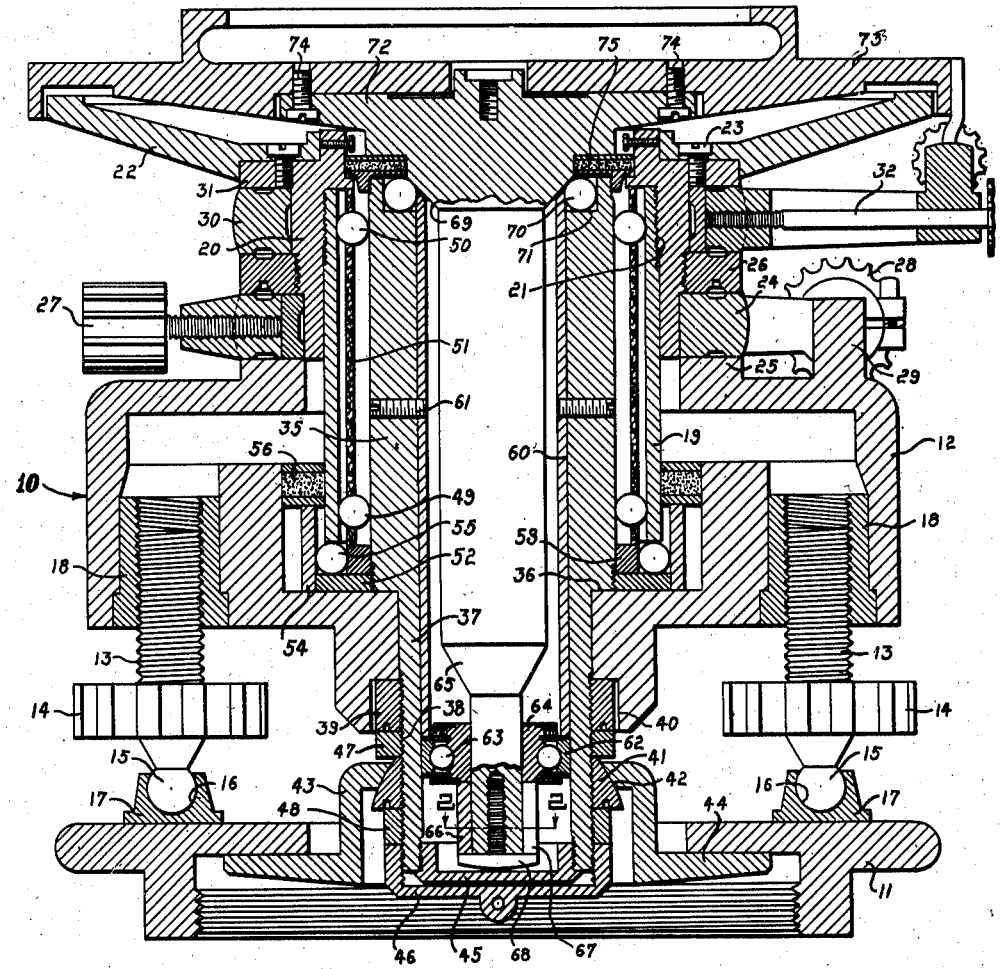
Fig. 1 is an enlarged central sectional view showing the features of my invention.
Figure 2:
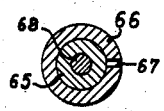
Fig. 2 is a section taken on line 2—2 of Fig. 1.

This invention is an improvement on the inventions shown in my prior patents, No. 2,208,014, granted July 16, 1940, and No. 2,164,051, granted June 27, 1939. While my prior patents disclose novel means for supporting the spindle and shell of a surveying instrument in anti-friction bearings, the present application discloses improved details of construction which I have found highly advantageous in actual practice, particularly in constructions wherein the available space for mounting bearings is limited. In the prior patents I have shown the use of standard types of bearings including separate ball races while in the present application, I have shown how the components of the instrument may be adapted also to serve as ball races by the use of novel ball supporting means.

In the accompanying drawings my invention is shown as embodied in a supporting head which is indicated generally at 10. As shown the head includes a foot plate 11 on which a leveling head 12 is supported by a plurality of screws 13. Each of the screws 13 includes a head 14 terminating in a ball member 15 which engages a socket 16 on a foot member 17 on the foot plate 11. The screws 13 also engage in threaded bushings 18 on the leveling head.

A shell 19 mounted in the leveling head engages a collar 20 as at 21 which in turn supports a lower plate 22 secured thereto as by screws 23.

A clamp ring 24 engages between a shoulder 25 on the head and a retaining nut 26 on the collar 20. The clamp ring as shown includes a clamp screw assembly 27 and a slow motion assembly 28 which connects the collar 20 to the head 12 through a lug 29 on the head.

A clamp ring 30 engages the retaining nut 26 and a flange 31 on the collar 20 and includes a clamp screw assembly 32 which includes suitable slow motion device (not shown).

A hollow post 35 is fitted within the shell 19 and includes a shoulder 36 engaging the head 12 and a portion 37 which projects through a bore in the head. The post includes a lower threaded portion 38 which is engaged by a threaded locking ring 39, the latter engaging in a shouldered recess 40 in the head to hold the post in secure position on the head.

The threaded portion of the post includes a nut 41 having a spherically curved portion 42 engaging a similar surface on a flange 43 mounted on a shifting plate 44 which engages the foot plate 11. A plug 45 fits within the lower end of the post 35 and a lock cap 46 engages the outer surface of the post 35. Spacer nuts 47 and 48 are positioned between the ring 39 and the nut 41 and between the cap 46 and the nut 41. The outer surface of the post 35 and the inner surface of the shell 19 are hardened and ground and ball bearings 49 and 50 are positioned in the annular space therebetween. The ball bearings 49 and 50 engage a spacing sleeve 51 preferably of fiber or similar material. The individual ball members engage apertures in the sleeve 51 and are thereby held in position both axially and circumferentially.

A ring 52 engages the head 12 and threadedly engages the post 35. A second ring 53 engages the post 35 above the ring 52. A third ring 54 engages the circumference of the ring 52. Balls 55 are positioned within the annular space formed by the three rings and support the shell 19. A suitable seal 56 is interposed between the shell 19, the head 12, and the ring 54.

From the foregoing description it will be apparent that the ball bearings 49, 50 and 55 serve to rotatably support the shell 19 upon the post 35.

A sleeve 60 is positioned within the hollow post 35 and is secured therein by set screws 61. The lower end of the sleeve 60 engages the outer race 62 of a ball bearing 63. The inner race 64 is mounted on the lower end of a spindle 65 and is held in place on the spindle by a ring 66 which is slotted as at 67 and secured by a screw 68. The upper portion of the spindle includes an inclined shoulder 69 which engages ball bearings 70, the latter engaging in a bearing recess 71 on the interior of the post 35 and the construction is such that when the screw 68 is tightened the bearing race 62 is urged against the sleeve 60 and the balls 70 are urged against the bearing shoulder 69.

It will thus be seen that the post 35 serves as an inner support for the outer bearings and also serves as an outer support for the inner bearings.

The spindle 65 includes an enlarged head portion 72 supporting an upper plate 73 secured thereby as by screws 74. A suitable seal 75 is interposed between the head portion 72, the post 35, and the collar 20.

In the modification shown in Fig. 3 similar parts are designated by similarly double-primed reference characters. In the modification, the post 35" includes an inner sleeve 110 secured in place by screws 111. A bearing race 62" engages the end of the sleeve 110 and is held in place and functions in a manner similar to the bearing ring 62 previously described.

The post 35" includes a ring 112 which coacts with ball bearings 113, the latter engaging an inclined bearing face 114 on the shell 19".

At its upper end the post 35" includes a shoulder ring 117 supporting ball bearings 118 which in turn engage the interior of the shell 19" and the exterior of the post 35".

The post 35" is internally recessed at its upper end as at 121 to receive ball bearings 122 which engage an inclined bearing face 123 on the spindle 65".

An annular seal 124 is disposed between the spindle 65" and the upper end of the post 35".

Thus it will be apparent that the spindle 65" is supported by the bearings 63" and 122 on the post 35" and that the post 35" is in turn supported by the bearings 113 and 118.

From the foregoing description it will be apparent that I have invented a novel device which is highly efficient for the intended purpose.

Having thus described my invention, I claim:

1. In a support for a surveying instrument telescope, a foot plate, a hollow post universally mounted on said foot plate, a leveling head on said post, leveling screws engaging said foot plate and said head for leveling the latter, a shell about said post and spaced therefrom, balls disposed between said shell and said post, a sleeve supporting said balls, an extending ring on said post adjacent the lower end of said shell, balls disposed between and engaging said ring and the lower end of said shell, a lower bearing in said post, a spindle slidably and rotatably engaging the said lower bearing, a ring on said spindle and engaging said lower bearing, threaded means on said spindle engaging said ring, an upper bearing engaging the interior of said post and the exterior of said spindle, an upper plate mounted on said spindle and a lower plate mounted on said shell adjacent said upper plate.

2. In a support for a surveying instrument telescope, a foot plate, a hollow post universally mounted on said foot plate, said post having a shoulder, a leveling head including a portion engaging said shoulder, threaded means on said post and engaging the head to urge the head against the shoulder, leveling screws engaging said foot plate and said head for leveling the latter, a shell about said post and spaced therefrom, ball bearings disposed between said shell and said post, a sleeve disposed between said shell and said post and having apertures receiving said ball bearings, an extending ring on said post adjacent the lower end of said shell, balls disposed between and engaging said ring and the lower end of said shell, a lower plate on said shell, a sleeve secured within said hollow post, a lower bearing within said post and engaging the lower end of said sleeve, a spindle engaging said lower bearing, an upper interior bearing recess in said post, balls in said recess, said spindle having an inclined bearing face engaging said last mentioned balls, and an upper plate mounted on said spindle adjacent said lower plate on said shell, said plates being mounted for relative indicating movement about the axis of said spindle.

3. In a support for a surveying instrument telescope, a foot plate, a hollow post universally mounted on said foot plate, said post having a shoulder, a leveling head including a portion engaging said shoulder, threaded means on said post and engaging the head to urge the head against the shoulder, leveling screws engaging said foot plate and said head for leveling the latter, a shell about said post and spaced therefrom, ball bearings disposed between and engaging said shell and said post, a sleeve having apertures receiving and supporting said bearings axially and circumferentially, an extending ring on said post, balls disposed between and engaging said ring and the lower end of said shell, a lower plate on said shell, a sleeve secured within said hollow post, a lower bearing within said post, the outer element of said lower bearing engaging the lower end of said sleeve, a spindle slidably engaging the inner element of said lower bearing, a spacer ring on said spindle engaging said inner element, screw means on said spindle engaging said spacer ring, an upper interior bearing recess in said post, balls in said recess, said spindle having an inclined bearing face engaging said last mentioned balls, and an upper plate mounted on said spindle adjacent said lower plate on said shell, said plates being mounted for relative indicating movement about the axis of said spindle.

4. In a support for a surveying instrument telescope, a foot plate, a hollow post universally mounted on said foot plate, a leveling head on said post, a shell about said post and spaced therefrom, a projecting ring on said post adjacent the lower end of said shell, balls engaging said ring and said post, the lower end of said shell having an inclined bearing face, said balls engaging said face, an upper anti-friction bearing disposed between said shell and said post, a lower antifriction bearing within said post, a spindle within said post and engaging said lower bearing, an upper bearing disposed between said spindle and said post, an upper plate supported on said spindle and a lower plate mounted on said shell adjacent said upper plate, said plates being mounted for relative indicating movement about the axis of said spindle.

5. In a support for a surveying instrument telescope, a foot plate, a hollow post universally mounted on said foot plate, a leveling head on said post, a lower projecting ring on said post, balls engaging said ring, a shell about said post and spaced therefrom, the lower end of said shell having an inclined bearing face, said balls engaging said face and said post, an upper ring on said post, balls on said upper ring and disposed between and engaging said post and said shell, a sleeve secured within said post, an anti-friction bearing within said post, the outer element of said bearing engaging the lower end of said sleeve, a spindle within said post and slidably engaging the inner element of said bearing, a nut on said spindle and engaging said inner element, an enlarged head portion on said spindle, said head portion having an inclined bearing face, balls engaging said bearing face, said post having a recess, said last mentioned balls being disposed in said recess, an upper plate mounted on said spindle, and a lower plate mounted on said shell adjacent said upper plate, said plates being mounted for relative indicating movement about the axis of said spindle.

6. In a support for a surveying instrument telescope, a foot plate, a hollow post universally mounted on said foot plate, said post having a shoulder, a leveling head including a portion engaging said shoulder, threaded means on said post and engaging the head to urge the head against the shoulder, leveling screws engaging said foot plate and said head for leveling the latter, a shell about said post and spaced therefrom, a lower projecting ring on said post, balls engaging said ring and said post, the lower end of said shell having an inclined bearing face, said balls engaging said face, sealing means disposed between said head and said shell, an upper ring on said post, balls on said ring, said last mentioned balls being disposed between and engaging said post and said shell, a sleeve secured within said post, an anti-friction bearing within said post, the outer element of said bearing engaging the lower end of said sleeve, a spindle within said post and slidably engaging the inner element of said bearing, a nut on said spindle and engaging said inner element, an enlarged head portion on said spindle, said head portion having an inclined bearing face, balls engaging said bearing face, said post having a recess, said last mentioned balls being arranged in said recess, sealing means disposed between said shell said spindle and said post at the upper end thereof, and an upper plate mounted on said spindle and a lower plate mounted on said shell adjacent said upper plate, said plates being mounted for relative indicating movement about the axis of said spindle.

7. In a support for a surveying instrument telescope, a foot plate, a hollow post universally mounted on said foot plate, a leveling head on said post, leveling screws engaging said foot plate and said head for leveling the latter, a shell about said post and spaced therefrom, balls disposed between and engaging said shell and said post, means supporting said balls, an extending ring on said post adjacent the lower end of said shell, balls disposed between and engaging said ring and the lower end of said shell, a lower bearing in said post, a spindle within said post and slidably engaging the said lower bearing, means on said spindle and engaging said lower bearing, there being an upper interior bearing recess in said post, balls in said recess, said spindle having an inclined bearing face engaging said last mentioned balls, an upper plate mounted on said spindle, and a lower plate mounted on said shell adjacent said upper plate, said plates being mounted for relative indicating movement about the axis of said spindle.

8. In a support for a surveying instrument telescope, a foot plate, a hollow post universally mounted on said foot plate, a leveling head on said post, leveling screws engaging said foot plate and said head for leveling the latter, a sleeve secured within said hollow post, a lower bearing comprising an inner and an outer element within said post, the outer element of said lower bearing engaging the lower end of said sleeve, a spindle having a cylindrical portion slidably engaging the inner element of said lower bearing, means on said spindle engaging the end portion of said inner element, there being an upper interior bearing recess in said post, balls in said recess, said spindle having an inclined bearing face engaging said balls, and telescope mounting means on said spindle.

AMBER N. BRUNSON,